US010484056B2

(12) United States Patent
Garcia

(10) Patent No.: US 10,484,056 B2
(45) Date of Patent: Nov. 19, 2019

(54) ANALOG BEAM SIMULATION FOR WIRED DEVICE TESTING IN CP-OFDM SYSTEMS

(71) Applicant: Keysight Technologies, Inc., Santa Rosa, CA (US)

(72) Inventor: Javier Campos Garcia, Fuengirola (ES)

(73) Assignee: Keysight Technologies, Inc., Santa Rosa, CA (US)

(*) Notice: Subject to any disclaimer, the term of this patent is extended or adjusted under 35 U.S.C. 154(b) by 85 days.

(21) Appl. No.: 15/666,028

(22) Filed: Aug. 1, 2017

(65) Prior Publication Data

US 2019/0044583 A1 Feb. 7, 2019

(51) Int. Cl.
| | | |
|---|---|---|
| *H04B 7/0417* | (2017.01) | |
| *H04L 27/26* | (2006.01) | |
| *H04B 7/06* | (2006.01) | |
| *H04W 72/04* | (2009.01) | |
| *H04B 17/391* | (2015.01) | |
| *H04L 5/00* | (2006.01) | |
| *H04B 17/29* | (2015.01) | |
| *H04B 17/309* | (2015.01) | |
| *H01Q 3/26* | (2006.01) | |
| *H04B 10/077* | (2013.01) | |

(52) U.S. Cl.
CPC ......... *H04B 7/0417* (2013.01); *H04B 7/0617* (2013.01); *H04B 17/29* (2015.01); *H04B 17/309* (2015.01); *H04B 17/3912* (2015.01); *H04L 5/0007* (2013.01); *H04L 27/2607* (2013.01); *H04L 27/2636* (2013.01); *H04W 72/0446* (2013.01); *H01Q 3/26* (2013.01); *H01Q 3/267* (2013.01); *H04B 10/0775* (2013.01)

(58) Field of Classification Search
CPC .............. H04B 7/0417; H04B 17/3912; H04B 7/0617; H04L 5/0007; H04L 27/2607; H04L 27/2636
See application file for complete search history.

(56) References Cited

U.S. PATENT DOCUMENTS

| | | | |
|---|---|---|---|
| 8,565,193 | B2 | 10/2013 | Ylitalo |
| 9,001,918 | B2 | 4/2015 | Taori et al. |
| 9,083,454 | B2 | 7/2015 | Wicker, Jr. et al. |
| 9,294,324 | B2 | 3/2016 | Schmidt |
| 2015/0257073 | A1 | 9/2015 | Park et al. |
| 2016/0192353 | A1 | 6/2016 | Abdoli et al. |
| 2016/0204507 | A1 | 7/2016 | Karjalainen |

*Primary Examiner* — Kevin C. Harper
*Assistant Examiner* — Henry Baron

(57) ABSTRACT

A test device for simulating analog beams applied to a DUT includes a memory that stores instructions and a processor that executes the instructions. When executed by the processor, the instructions cause the test device to perform a process that includes obtaining, from the memory and based on instructions received for testing the DUT, a predetermined power level for a beam to be simulated for the DUT and a predetermined time delay for the beam to be simulated for the DUT. The process also includes applying the predetermined power level for the beam and the predetermined time delay for the beam to a set of subcarriers and cyclic prefix orthogonal frequency-division multiplexing (CP-OFDM) symbol to obtain simulated characteristics of the beam from the perspective of the DUT. The process also includes sending, over a wired connection, the simulated characteristics of the beam from the processor to the DUT.

17 Claims, 7 Drawing Sheets

Test Device

ANALOG BEAM SIMULATION FOR WIRED DEVICE TESTING IN CP-OFDM SYSTEMS

BACKGROUND

In multiple-input multiple-output (MIMO) communications systems, antennas may be used on both a base station and on a mobile device to exploit a phenomenon known as multipath propagation to achieve higher data rates. In general, MIMO communications systems simultaneously send and receive multiple data signals over each radio channel. The multipath propagation phenomenon is the result of environmental factors that influence the data signals as they travel between the base station and the mobile device, including, for example, ionospheric reflection and refraction, atmospheric ducting, reflection from terrestrial objects and reflection from bodies of water. Because of these factors, the data signals experience multipath interference that results in constructive interference, destructive interference, or fading, and phase shifting of the data signals.

The base stations and mobile devices of MIMO communications systems may each have multiple antennas, for example, configured as an antenna array or multiple radiating antenna elements configured on a single antenna. The term "advanced antenna" as used herein refers to both antenna arrays as well as single antennas with multiple radiating antenna elements, and refers to an integrated system in which each antenna (in an array) and radiating antenna element (for a single antenna) is individually logically controllable.

MIMO communications systems require testing. A typical MIMO test system for testing a device under test (DUT) includes an anechoic chamber, the DUT in the anechoic chamber, a test system computer, and various electrical cables for interconnecting components. During over the air (OTA) testing, the test system computer receives information from the DUT that the test system computer processes to evaluate the transmit and/or receive capabilities of the DUT as the DUT is subject to OTA testing. The OTA testing may involve an advanced antenna of the DUT and/or of a user equipment (UE) device or a UE device emulator, for example, communicating by selectively controlling the advanced antenna to form beams. A complex weight pattern is introduced to the advanced antenna in the time domain signal to form a beam. Beam characteristics are compared against expectations to measure whether the advanced antenna of the DUT works properly. Beam characteristics include, e.g., total transmit power, error vector magnitude (EVM) of modulation formats, antenna radiation pattern, etc.

The next generation of wireless infrastructure (e.g., base stations) and mobile devices will fall under the 5th generation (5G) standard(s) which are still being negotiated at the time of this application. Beamforming (i.e. generation of beams using advanced antennas) is a key aspect of 5G. The gain obtained by beamforming is needed to cope with the increased path loss of higher frequency bands as well as to increase the 5G systems capacity. The elements of an advanced antenna in 5G will be very small and there will be a large number of such elements integrated together with other electrical components on the same circuit board. For these reasons, conventional MIMO testing may not be feasible, or even possible, for 5G base stations and mobile devices.

As explained above, traditional OTA testing of a DUT is accomplished using an advanced antenna of multiple antennas or radiating antenna elements onto which a complex weight pattern is introduced to form a beam that is then applied to a time domain signal. The traditional methods are not amenable to applying different beams per subcarrier or CP-OFDM symbol since they are applied to the time domain signal. The traditional approaches cannot be directly applied to wired testing of the DUT because the beamforming effect is achieved due to the wireless signal propagation properties between, e.g., the advanced antennas in the OTA test system. Moreover, as the required radiation patterns of beams are narrower and the number of beams bigger, system cost and complexity increases, particularly if external equipment is added since testing requires increased synchronization as additional equipment is added. Analog beam simulation for wired device testing in CP-OFDM systems described herein provides for testing a DUT without adding additional equipment.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
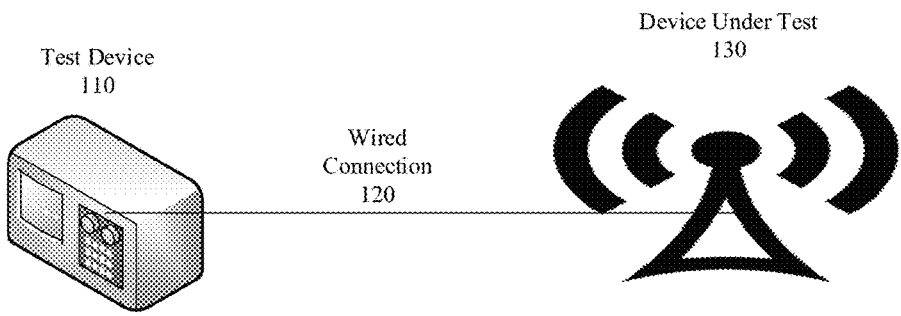
FIG. 1A illustrates a system overview for analog beam simulation for wired device testing in CP-OFDM systems, in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described below, analog beamforming testing capabilities are provided to a test device that uses cyclic prefix orthogonal frequency-division multiplexing (CP-OFDM) for transmissions. As used herein, the term "cyclic prefix" means that a copy of the last samples of a symbol is inserted as a prefix before each symbol, as this helps eliminate Inter Symbol Interference (ISI) and converts the effect of the channel impulse response to a circular convolution operation. A symbol in digital communications is a pulse or tone representing an integer number of bits. OFDM is a frequency-division multiplexing (FDM) scheme used as a digital multi-carrier modulation scheme that extends the concept of a single subcarrier modulation by using multiple subcarriers within the same single channel. A subcarrier is a band of a radio frequency carrier wave which is modulated to send information. In OFDM, the closely-spaced orthogonal subcarriers are transmitted in parallel, and are each modulated with a conventional digital modulation scheme such as 8PSK, 16QAM etc., and in CP-OFDM the cyclic prefix (CP) provides a periodically repeated interval of information used to guard bands between symbols. An initial part of a symbol is copied and inserted at the end of the symbol. In other words, an initial part of the information in a symbol is copied to the end of each symbol, and this allows a receiver to identify the end points of each symbol and eliminate interference that otherwise is known to occur between symbols, i.e., the ISI.

FIG. 1A illustrates a system overview for analog beam simulation for wired device testing in CP-OFDM systems, in accordance with a representative embodiment. In FIG. 1A, a test device 110 is connected to a DUT 130 by a wired connection 120. The DUT 130 may be a prototype of an apparatus that will be specifically configured to communicate wirelessly using an advanced antenna, but is tested as described herein over a wired connection 120 (as opposed to OTA testing). The testing is a simulation of wireless communications that will involve the advanced antenna, but simulated characteristics of beams used for the wireless communications are sent to the DUT 130 over the wired connection 120 from the test device 110.

The wired connection 120 uses a wire (e.g., cable) to connect the test device 110 to the DUT 130. The wired connection 120 may be or include copper or fiber optic. Examples of a wired connection 120 include category 5 cable and category 6 cable, each of which is a type of twisted pair cable for Ethernet.

In analog beamforming (i.e., wireless) transmission schemes, both transmission and reception are performed using radiation patterns which focus transmission energy on the receiver. For testing purposes, from the perspective of the receiver (e.g., of the DUT 130 in FIG. 1A), the received signal is a combination of the effects of the transmission and reception radiation patterns. The channel for each beam can be approximated by only two parameters, i.e., power gain and beam delay, assuming that channel bandwidth is larger than signal bandwidth such that all frequency components of the signal experience the same magnitude of fading.

A power gain between the test device 110 and the DUT 130 will always be a loss for a signal transmitted wirelessly from the test device 110 to the DUT 130. The power gain is the ratio of the level of output power transmitted from the test device 110 to the level of input power received by the DUT 130. The power gain seen by the DUT 130 is the combination of the gain of the transmission radiation pattern $G_{tx}(\theta_{tx})$ and the reception radiation pattern $G_{rx}(\theta_{rx})$, where $\theta_{tx}$ and $\theta_{rx}$ are angles of arrival of the beams from the transmitter and the receiver. For example, $\theta_{tx}$ may be the angular difference between horizontal and a beam that runs through the volumetric center of the transmission beam, and $\theta_{rx}$ may be the angular difference between horizontal and a beam that runs through the volumetric center of the reception beam. The combined gain seen by the DUT 130 is expressed by equation (1) as follows:

$$G(\theta_{tx},\theta_{rx})=G_t(\theta_{tx}) \cdot G_{rx}(\theta_{rx}) \tag{1}$$

A beam delay is a time delay from when information is transmitted from the test device 110 to when the information is received by the DUT 130. The beam delay will reflect the distance from the test device 110 to the DUT 130, as well as the speed of the signal that carries the information, i.e., the distance per time. An arbitrary example is that information carried at 10 feet per second between devices 500 feet apart will reach the destination device in 50 seconds, i.e., 500 feet/50 seconds (10 feet/second). The delay of the transmission from the test device 110 to the DUT 130 may be different than the delay of the transmission from the DUT 130 to the test device 110, since each represents a different channel.

Figure 1B:
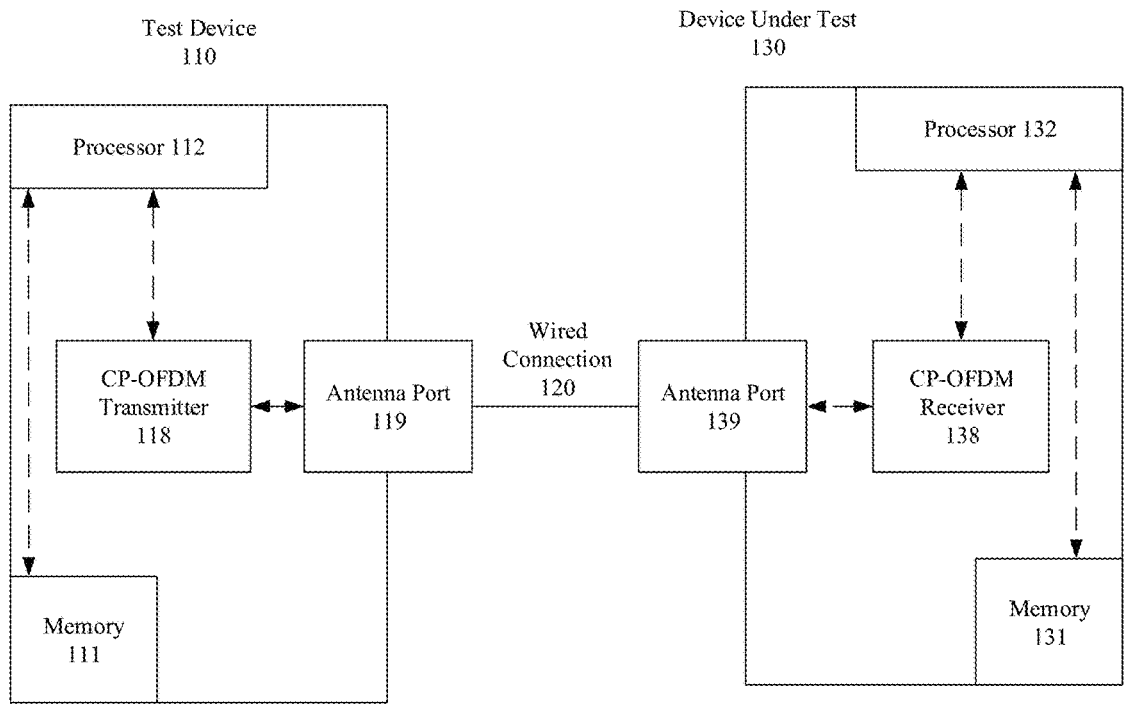
FIG. 1B illustrates details of a test device and DUT in the system overview of FIG. 1A for analog beam simulation for wired device testing in CP-OFDM systems, in accordance with a representative embodiment.

FIG. 1B illustrates details of a test device 110 and DUT 130 in the system overview of FIG. 1A for analog beam simulation for wired device testing in CP-OFDM systems, in accordance with a representative embodiment.

In FIG. 1B, the test device 110 includes a memory 111, a processor 112, a CP-OFDM transmitter 118 (which may include a signal generator) and an antenna port 119. The DUT 130 includes a memory 131, a processor 132, a CP-OFDM receiver 138, and an antenna port 139.

The antenna port 119 is a port on the test device 110 that provides for signal transmission under identical channel conditions. The antenna port 139 is a port on a DUT 130 that provides for signal transmission under identical channel conditions. For example, the LTE standard defines antenna ports generally as logical entities distinguished by reference signal sequences. In normal operations that do not involve testing of the sort described herein, the antenna ports 119, 139 would be connected to advanced antennas. However, for the analog beam simulation for wired testing in CP-OFDM systems according to various embodiments described herein, the antenna port 139 is connected to the antenna port 119 by the wired connection 120.

The test device 110 modulates beam characteristics using the CP-OFDM transmitter 118. The beam characteristics are retrieved from the memory 111 by the processor 112, and provided to the CP-OFDM transmitter 118 for modulation. The memory 111 may store beam identifications, such as names, in association with correlated beam characteristics that are specific to the beam identifications. In a simplified model that does not take modulation into account, the transmitted signal from the test device 110, designated herein as x[n], is subject to the beam gain designated as β and the beam delay designated as no, and is received at the DUT 130 as y[n], which is equal to β·x[n−n$_0$]. Instructions provided to the test device 110 for testing the DUT 130 in a simulation may include beam identifications, as well as testing information such as a type of advanced antenna of the DUT 130 to use for the simulation, as well as orientations of the advanced antennas of both the test device 110 and DUT 130. The type of advanced antenna of the DUT 130 may be used to specify the number and arrangement of antennas in an array of the advanced antenna or the number and arrangement of radiating antenna elements in a single antenna used as the advanced antenna, though the details for each type of advanced antennas may be pre-configured for testing in the simulations described herein. Similarly, the orientation between the test device 110 and DUT 130 may be fixed, such as when the testing environment is fixed similar to an anechoic chamber though an anechoic chamber is not required for the simulations described herein.

Taking modulation by the CP-OFDM transmitter 118 into account, the DUT 130 receives modulated signals from the test device 110 over the wired connection 120 through the antenna port 139. The modulation by the CP-OFDM transmitter 118 is explained in detail below with reference to FIG. 5. The CP-OFDM receiver 138 analyzes the received modulated signals and may demodulate the modulated signals to directly obtain the beam characteristics. However, the received modulated signals may also be provided to the processor 132 without demodulation, such as when the processor 132 is to process the modulated signals as if the modulated signals are being initially processed when received by an antenna. The processor 132 processes the modulated or demodulated signal from the CP-OFDM receiver 138 in accordance with instructions stored in the memory 131. The processing by the processor 132 may involve an algorithm that processes beam characteristics for the DUT 130 in normal operations. In other words, according to an aspect of the present disclosure, beam characteristics from the analog beam simulation can be provided to the processor 132 for processing using an algorithm, and the DUT 130 can be tested by testing the algorithm on the beam characteristics of the signal received from the test device 110 without requiring wireless signaling propagating over the air between the test device 110 and DUT 130.

Figure 2:
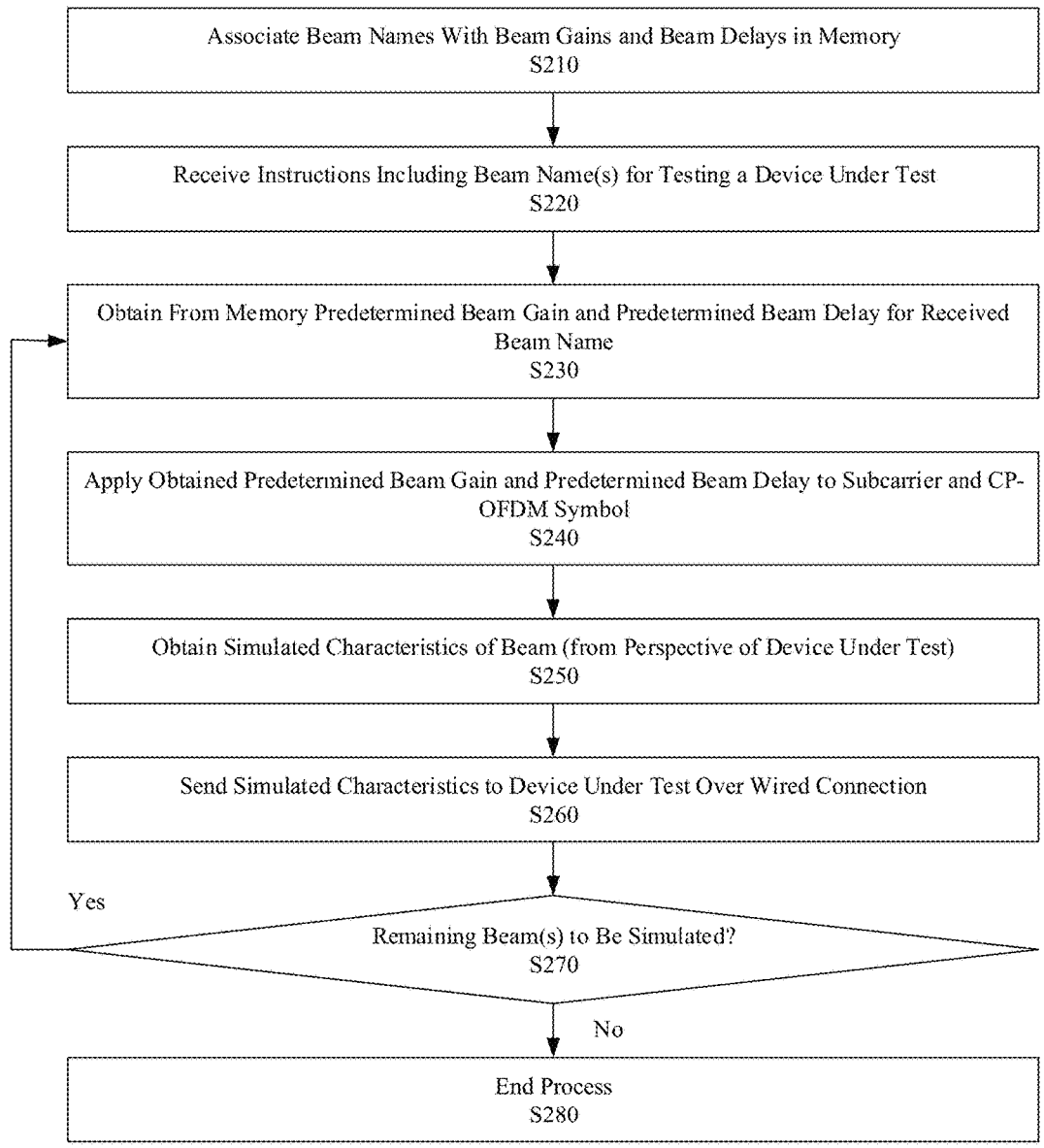
FIG. 2 illustrates a flow diagram for operating testing in analog beam simulation for wired device testing in CP-OFDM systems, in accordance with a representative embodiment.

FIG. 2 illustrates a flow diagram for operating testing in analog beam simulation for wired device testing in CP-OFDM systems, in accordance with a representative embodiment.

At S210, beam names are associated with beam gains and beam delays in a memory 111. The beam names are specifically correlated with the beam gains and beam delays in testing, and may involve multiple tests that both set and confirm a correlation between a beam and a beam gain and beam delay. A memory 111 may store thousands of sets of beam names, beam gains and beam delays, each of which reflects specific testing of corresponding beams in different configurations of an advanced antenna of a test device 110.

At S220, instructions are received for testing a DUT 130. The instructions include beam names corresponding to specific beams. The instructions may be received from the DUT 130 by the test device 110, but may also be received from another source including a memory device, such as a portable memory stick. The instructions may also include a type of advanced antenna of the DUT 130 to use for the simulation, as well as orientations of the advanced antennas of both the test device 110 and DUT 130.

At S230, a testing process begins by obtaining from memory 111 a predetermined beam gain and predetermined beam delay for a received beam name corresponding to a beam. The beam gain and beam delay are applied to subcarriers and a CP-OFDM symbol at S240, and used to obtain simulated characteristics of a beam from the perspective of the DUT 130 at S240. The simulated characteristics are then sent to the DUT 130 from the test device 110 over the wired connection at S260, i.e., without generating the beam and confirming the characteristics of the beam. The signal sent over the wired connection 120 reflects the simulated characteristics of a beam from the perspective of the DUT 130, so that the simulated characteristics of the beam are not necessarily sent as data. Of course, the simulated characteristics can be also carried by the signal sent over the wired connection 120 as data, and not only as characteristics of the signal sent over the wired connection 120.

At S270 the test device 110 determines whether additional beams are to be simulated, and when no remaining beams are to be simulated the process ends at S280. When additional beams remain to be simulated, the process returns to S230 and the next set of beam gains and beam delays are obtained for the next beam. The process from S230 to S270 repeats until no beams are left to be simulated.

Using the explanations above, a model of analog beamforming transmission and reception is useful for explaining how analog beam simulation for wired device testing in CP-OFDM systems can be implemented. In such a model, if more than one beam is used, the received signal at the DUT 130 will be the combination of the effect of each of the receiver/transmitter pair of beams. The combined effect can be simplified as a different gain and delay per each of the transmission/reception beams. This model works for wired connection between the DUT 130 and the test device 110, but not for a wireless channel since the effects of a wireless channel would necessarily be introduced to this model and would require modifications.

Under the described model, the signal received at the DUT 130 can be characterized using equation (2), which was previously introduced above, where y[n] is the received signal at the DUT 130, x[n] is the transmitted signal, β is the beam gain and n0 is the beam delay:

$$y[n]=\beta \cdot x[n-n0] \quad (2)$$

Since the transmission is CP-OFDM based, if the delay n0 is small compared with the cyclic prefix length, the delay can be approximated as a circular delay by using Discrete Fourier Transform (DFT) properties.

Since the analog beam simulation for wired device testing described herein uses CP-OFDM, DFT properties can be used to describe the same beam model as described above but in the frequency domain. The beam model can be described in the frequency domain before IFFT. The delay can be applied as a rotation in the complex plane which depends on the subcarrier position and the delay itself. This phase rotation will be converted to a cyclic time shift after applying the IFFT. Additionally, due to the linear property of the DFT, the beam gain in the time domain can be applied as the same gain in the frequency domain.

A frequency bin is each of the subcarriers in the CP-OFDM transmission system. Under the assumption that the beam delay is small compared with the cyclic prefix, an expression for the frequency bin $X_{k,l}$ can be written, using the DFT properties, as equation (3):

$$X_{k,l} = \beta_l \cdot a_{k,l} \cdot e^{j\frac{2\pi k \cdot n_0^{(l)}}{N_{FFT}}} \quad (3)$$

In equation (3), k is IFFT subcarrier index; l is CP-OFDM symbol index; $\beta_l$ is the beam gain for the CP-OFDM symbol l; $n_0(l)$ is the beam delay for the CP-OFDM symbol l and subcarrier k, $N_{FFT}$ is the FFT size, $a_{k,l}$ is the modulated symbol for subcarrier k and OFDM symbol l, and $X_{k,l}$ is the frequency bin for IFFT processing and CP insertion for subcarrier k and OFDM symbol l after the application of the described beam model.

Implementation of the beam simulation described herein is performed in the frequency domain in each CP-OFDM symbol and subcarrier, as compared to applying beams to a time domain signal as in conventional beamforming. This allows applying a different beam gain and beam delay for each CP-OFDM symbol and subcarrier. The implementation of the operations will be described below with reference to FIGS. 5 and 6.

The model described above simulates the effect of different transmission and reception beams at the antenna port of the DUT by taking into account the beam gain $\beta_l$ for the CP-OFDM symbol l and the beam delay $n_0(l)$ for the CP-OFDM symbol l and subcarrier k. The beam transmission channel is incorporated as part of the test device 110 which implements the analog beamforming simulation method described in this disclosure as part of its functionality.

The simulated characteristics of the signal sent over the wired connection 120 are predetermined characteristics of an analog beam that have already been identified, ascertained, determined, or otherwise obtained during testing. Characteristics may include gain and delay, and may vary for each different beam that can be emitted from a test device 110, and for the relative positioning between the test device 110 and the DUT 130. A test device 110 can emit thousands of different beams via an advanced antenna. The predetermined characteristics are determined and confirmed during extensive testing of samples of advanced antennas under test in each different configuration of the advanced antennas. As a result, when a DUT 130 is to be tested for each configuration, the expected power gain and time delay for each configuration and beam are already known. The extensive pre-testing enables the test device 110 to provide the simulated characteristics to the DUT 130 over the wired connection 120, avoiding the need to emit a wireless signal from the test device 110 and read the wireless signal at the DUT 130.

Figure 3A:
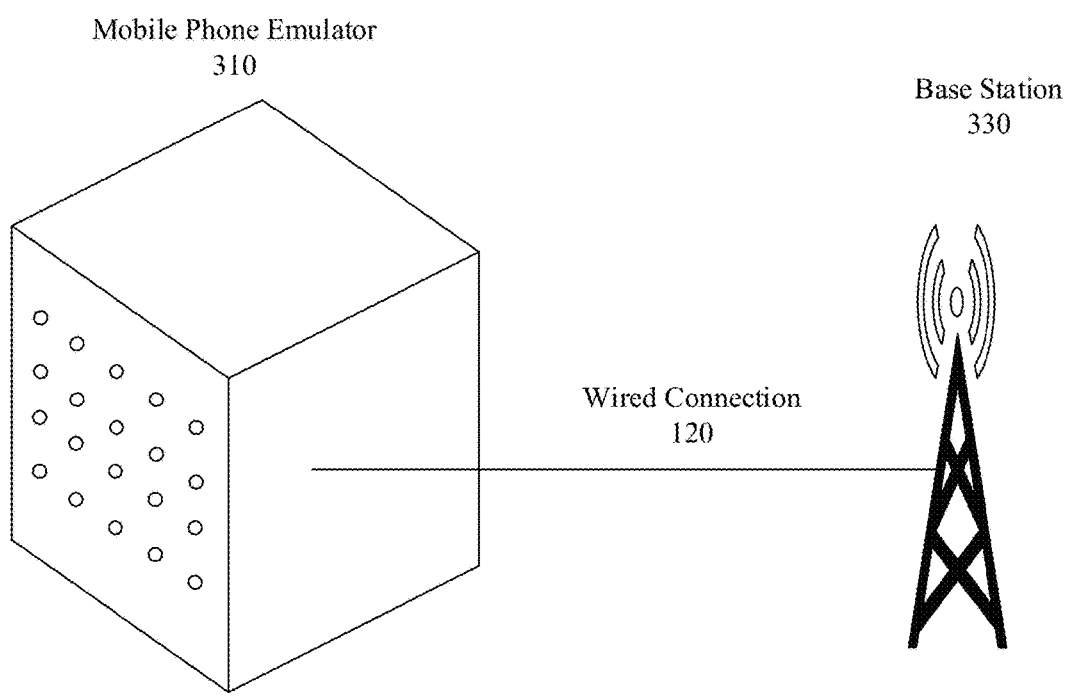
FIG. 3A illustrates an exemplary system for analog beam simulation for wired device testing in CP-OFDM systems, in accordance with a representative embodiment.

FIG. 3A illustrates another exemplary system for analog beam simulation for wired device testing in CP-OFDM systems, in accordance with a representative embodiment. In FIG. 3A, a mobile phone emulator 310 replaces the test device 110 in FIG. 1A. A base station 330 replaces the DUT 130 in FIG. 1A. The wired connection 120 from FIG. 1A is the same as the wired connection 120 in FIG. 3A.

A mobile phone emulator 310 is a type of test device 110, and is configured to simulate the behavior of a network that provides wireless communications between two different devices. As an example, a mobile phone emulator 310 as a test device 110 may mimic a base station in wireless communications with a mobile device such as a smart phone 330 as a DUT 130.

A base station 330 is an apparatus at the center of a cell in a cellular telephone system, and relays communications to and from wireless user devices. In FIG. 3A, the base station 330 may be a prototype being tested before mass production. In use, a base station 330 may be used to implement communications under the forthcoming 5G standard(s), and may also be connected to the internet via broadband cabling such as fiber optic cables.

A base station 330 is merely representative of a DUT 130, and other communications devices with an advanced antenna may also be tested using the wired testing in CP-OFDM systems described herein. Other devices that may serve as a DUT 130 include user mobile devices, internal network devices other than base stations, wireless routers, communications devices to be installed in vehicles including military vehicles, and other similar communications devices.

Figure 3B:
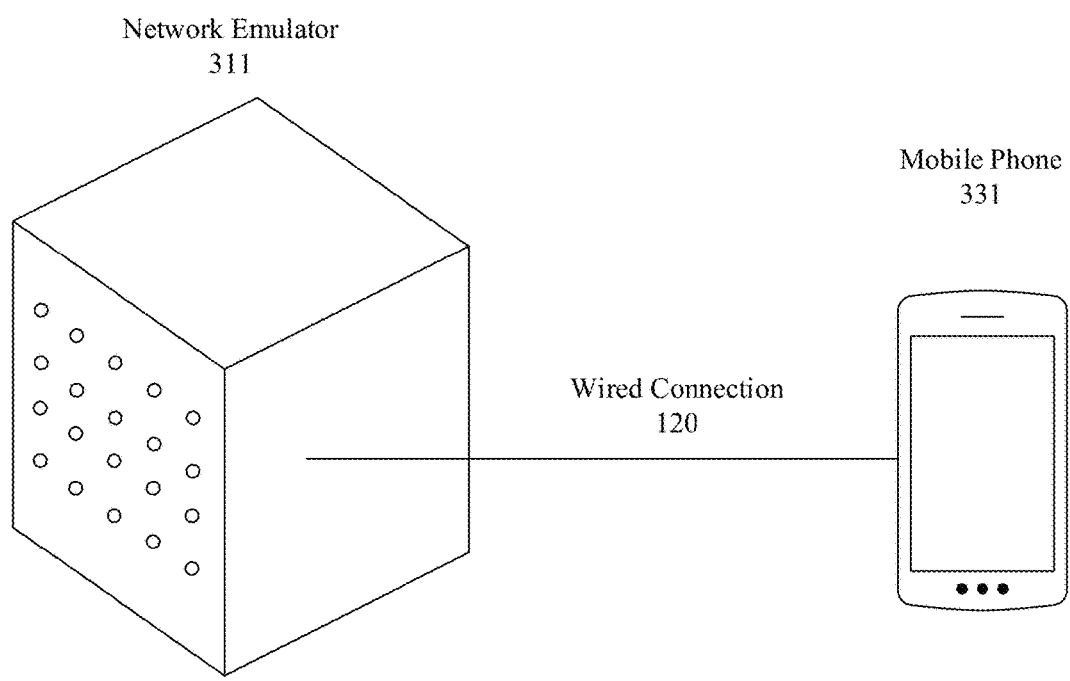
FIG. 3B illustrates another exemplary system for analog beam simulation for wired device testing in CP-OFDM systems, in accordance with a representative embodiment.

FIG. 3B illustrates another exemplary system for analog beam simulation for wired device testing in CP-OFDM systems, in accordance with a representative embodiment. In FIG. 3B, a network emulator 311 replaces the test device 110 in FIG. 1A. A mobile phone 331 replaces the DUT 130 in FIG. 1A. The wired connection 120 from FIG. 1A is the same as the wired connection 120 in FIG. 3B.

A network emulator 311 is a type of test device 110, and is configured to simulate the behavior of a network that provides wireless communications between two different devices. As an example, a network emulator 311 as a test device 110 may mimic a base station in wireless communications with a mobile device such as mobile phone 331 as a DUT 130.

A mobile phone 331 is an end wireless user device in a cellular telephone system, and communicates with a centralized relay such as base station 330 in FIG. 3A. In FIG. 3B, the mobile phone 331 may be a prototype being tested before mass production. A mobile phone 331 is merely representative of a DUT 130. In use, a mobile phone 331 may be used to implement communications under the forthcoming 5G standard(s), and may also be connected to the internet via broadband cabling such as fiber optic cables.

Figure 4:
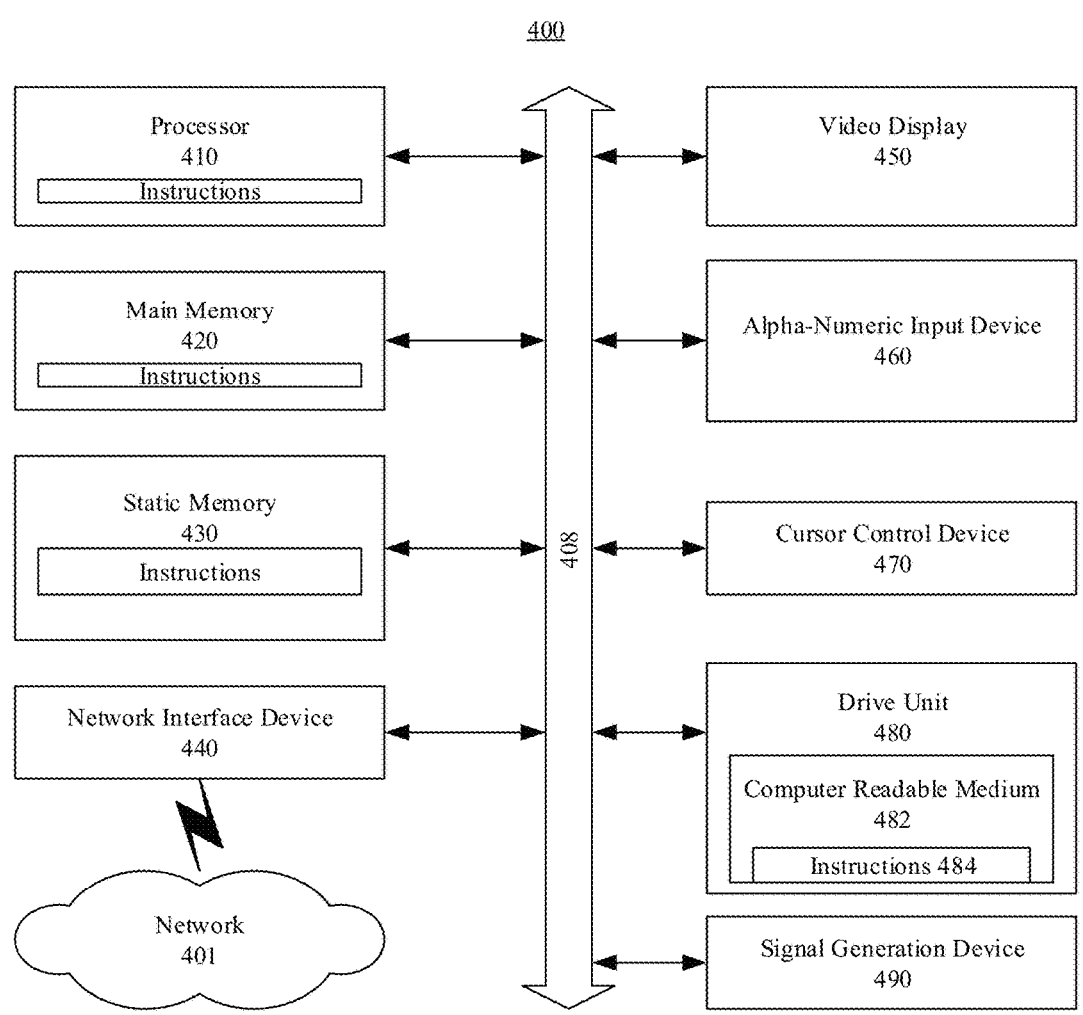
FIG. 4 illustrates an exemplary general computer system that includes a set of instructions for wired device testing in CP-OFDM systems, in accordance with a representative embodiment.

FIG. 4 illustrates an exemplary general computer system that includes a set of instructions for wired device testing in CP-OFDM systems, in accordance with a representative embodiment. FIG. 4 is an illustrative embodiment of a general computer system 400, on which a method of analog beam simulation for wired device testing in CP-OFDM systems can be implemented. The computer system 400 can include a set of instructions that can be executed to cause the computer system 400 to perform any one or more of the methods or computer based functions disclosed herein. The computer system 400 may operate as a standalone device or may be connected, for example, using a network 401, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a test device 110 or mobile phone emulator 310, a network emulator 311, a stationary computer, a mobile computer, a personal computer (PC), a laptop computer, a tablet computer, a wireless smart phone, or any other machine capable of executing a set of instructions (sequential or otherwise) that specify actions to be taken by that machine. The computer system 400 can be incorporated as or in a device that in turn is in an integrated system that includes additional devices. In an embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 includes a processor 410. The processor 410 for a computer system 400 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A processor is an article of manufacture and/or a machine component. The processor 410 for a computer system 400 is configured to execute software instructions to perform functions as described in the various embodiments herein. The processor 410 for a computer system 400 may be a general-purpose processor or may be part of an application specific integrated circuit (ASIC). The processor 410 for a computer system 400 may also be a microprocessor, a microcomputer, a processor chip, a controller, a microcontroller, a digital signal processor (DSP), a state machine, or a programmable logic device. The processor 410 for a computer system 400 may also be a logical circuit, including a programmable gate array (PGA) such as a field programmable gate array (FPGA), or another type of circuit that includes discrete gate and/or transistor logic. The processor 410 for a computer system 400 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 400 includes a main memory 420 and a static memory 430 that can communicate with each other via a bus 408. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 400 may further include a video display unit 450, such as a liquid crystal display (LCD), an organic light emitting diode (OLED), a flat panel display, a solid-state display, or a cathode ray tube (CRT). Additionally, the computer system 400 may include an input device 460, such as a keyboard/virtual keyboard or touch-sensitive input screen or speech input with speech recognition, and a cursor control device 470, such as a mouse or touch-sensitive input screen or pad. The computer system 400 can also include a disk drive unit 480, a signal generation device 490, such as a speaker or remote control, and a network interface device 440.

In an embodiment, as depicted in FIG. 4, the disk drive unit 480 may include a computer-readable medium 482 in which one or more sets of instructions 484, e.g. software, can be embedded. Sets of instructions 484 can be read from the computer-readable medium 482. Further, the instructions 484, when executed by a processor, can be used to perform one or more of the methods and processes as described herein. In an embodiment, the instructions 484 may reside completely, or at least partially, within the main memory 420, the static memory 430, and/or within the processor 410 during execution by the computer system 400.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 482 that includes instructions 484 or receives and executes instructions 484 responsive to a propagated signal; so that a device connected to a network 401 can communicate voice, video or data over the network 401. Further, the instructions 484 may be transmitted or received over the network 401 via the network interface device 440.

Figure 5:
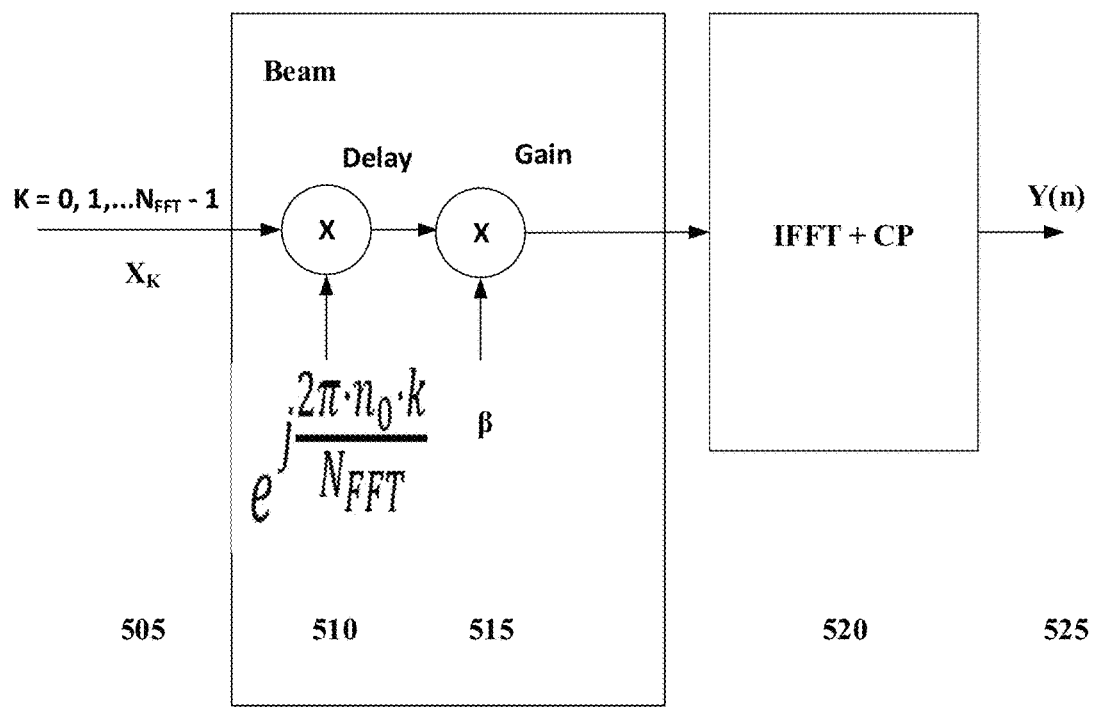
FIG. 5 illustrates internal operations of a test device or network emulator for wired device testing in CP-OFDM systems, in accordance with a representative embodiment.

FIG. 5 illustrates internal operations of a test device or network emulator for wired device testing in CP-OFDM systems, in accordance with a representative embodiment. The implementation of the beam simulation is performed in the frequency domain in each CP-OFDM symbol. As shown in FIG. 5, the beam delay will be applied per subcarrier in the frequency domain, before IFFT, by applying a phase shift to the modulated symbols. The beam gain will be applied per subcarrier in the frequency domain, also before IFFT. Phase rotation represents a transformed time delay and changes based on a subcarrier position in a beam model of a simulated beam. The time delay can be derived from the phase rotation by inverse fast Fourier transform (IFFT), which is used in the transmitter for OFDM communications.

In FIG. 5, the input $X_{k,l}$ is the frequency bin for IFFT processing and CP insertion for subcarrier k and OFDM symbol l. Thus, the input $X_k$ at 505 is in the frequency domain rather than the time domain, and the delay applied at 510 and the gain applied at 515 are applied in the frequency domain, before IFFT. As noted previously, the delay can be applied as a rotation which depends on the subcarrier position. The phase rotation can be converted to a cyclic time shift after applying the IFFT. The IFFP and cyclic prefix are applied by the CP-OFDM transmitter 118 at 520, and the output signal reflective of the viewpoint of the DUT 130 is output from the test device 110 at 525.

Figure 6:
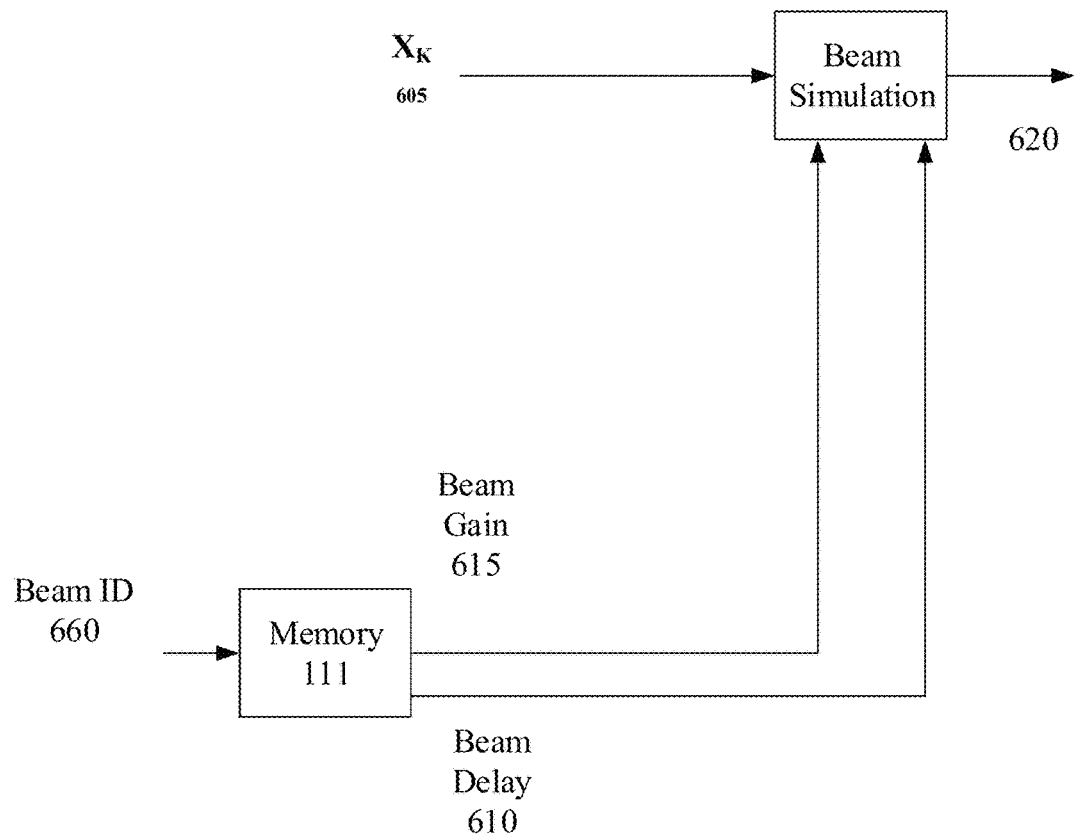
FIG. 6 illustrates additional internal operations of a test device or network emulator for wired device testing in CP-OFDM systems, in accordance with a representative embodiment.

FIG. 6 illustrates additional internal operations of a test device or network emulator for wired device testing in CP-OFDM systems, in accordance with a representative embodiment. In FIG. 6, a management scheme is shown where different beams are given different identifications, such as names, and stored in memory with correlated beam gains and beam delays. In this way, a beam identification can be provided to test device 110, mobile phone emulator 310 or network emulator 311, and the beam identification can be used to obtain the beam gain and beam delay for the analog beam corresponding to the beam identification. The management scheme reduces the configuration overhead without losing configurability. The analog beamforming management for the test device 110/mobile phone emulator 310/network emulator 311 is written in a memory 131 in the test device 110, mobile phone emulator 310 or network emulator 311, and will be used to simulate all the analog beams that will be used throughout the test. Each analog beam is defined by a pair of gain/delay values. The test device 110/mobile phone emulator 310/network emulator 311 will assign a beam identifier to each of the beams.

Similar to the embodiment shown in FIG. 5, for FIG. 6 the input $X_k$ is the frequency bin for IFFT processing and CP insertion for subcarrier k. Thus, the input $X_k$ at 605 is in the frequency domain rather than the time domain. In FIG. 6, a beam ID 660 is applied to memory 111, such as by the processor 112, in order to obtain the beam gain 615 and beam delay 610 that are applied in the frequency domain by the test device 110. The output at 620 will be the same signal that simulates a particular beam as it would be seen from the viewpoint of DUT 130/base station 330 if received, e.g., under ideal conditions, by an advanced antenna. As noted for all other embodiments, IFFT and CP are applied by CP-OFDM transmitter 118 in order to generate the simulated signal y[n].

An example arrangement of beam identifications and characteristics in a memory 111 is shown as a table below:

| ID  | Gain | Delay | Applied to:   | For Symbol |
|-----|------|-------|---------------|------------|
| ID1 | B1   | N1    | Subcarrier k1 | L          |
| ID2 | B2   | N2    | Subcarrier k2 | L          |
| ID3 | B3   | N3    | Subcarrier k3 | L          |
| ID4 | B4   | N4    | Subcarrier k4 | L          |

In FIG. 6, when configuring each subcarrier in a CP-OFDM symbol in the test device 110/mobile phone emulator 310, only the beam identifier will be provided instead of the full set of gain/delay parameters for all beams. One beam identifier will be provided per CP-OFDM symbol and subcarrier. When the test device 110/mobile phone emulator 310/network emulator 311 applies the configuration, the beam identifier is analyzed and used to read the actual gain/delay values from the previously written memory. The test device 110/mobile phone emulator 310/network emulator 311 then applies the actual gain/delay values to the beamforming simulation as described herein.

Accordingly, analog beam simulation for wired device testing in CP-OFDM systems enables a simplified testing architecture for analog beamforming by using a wired connection 120 between the DUT 130 and the test device 110. The present disclosure can be used with any appropriate CP-OFDM transmitting system with analog beamforming functionality, and will cause almost zero increase in complexity with respect to the transmitting system without analog beamforming. Any extra operations needed to perform the beam simulation can be introduced in digital signal processing chains, and allow a reduction in both cost and implementation complexity for test equipment.

Wired device testing in CP-OFDM systems may provide for improved control over beamforming parameters, simulation of different beams per subcarrier in a CP-OFDM system, simulation of different beams in each CP-OFDM symbol, and overall efficient use of resources when implemented.

One potential use of the analog beam simulation for wired testing in CP-OFDM systems is for prototypes being considered for manufacturing. A prototype may be provided as a DUT 130, and specifically configured so that the wired connection 120 is connected directly to an antenna port 139. In this way, the simulations described herein can be used to provide the same beam characteristics as the prototype would receive from an advanced antenna if the advanced antenna was being used to receive and/or transmit analog beams during testing. The prototype used as the DUT 130 can then run processes on the beam characteristics, and the processes run by the DUT 130 can be monitored to ensure that the processes operate correctly. The efficient mechanisms for testing analog beamforming described herein will benefit industry by reducing testing costs in terms of both time and money by using a wired connection 120 to provide characteristics of a beam in a simulation. The simulation can be used to provide beams rapidly, or even in batches, so that prototype devices can be tested in the same manner as if the intended advanced antennas were used in wireless testing.

Although analog beam simulation for wired device testing in CP-OFDM systems has been described with reference to several exemplary embodiments, it is understood that the words that have been used are words of description and illustration, rather than words of limitation. Changes may be made within the purview of the appended claims, as presently stated and as amended, without departing from the scope and spirit of analog beam simulation for wired device testing in CP-OFDM systems in its aspects. Although analog beam simulation for wired device testing in CP-OFDM systems has been described with reference to particular means, materials and embodiments, analog beam simulation for wired device testing in CP-OFDM systems is not intended to be limited to the particulars disclosed; rather analog beam simulation for wired device testing in CP-OFDM systems extends to all functionally equivalent structures, methods, and uses such as are within the scope of the appended claims.

For example, analog beamforming is one of the most important technologies and transmission schemes under consideration for 5G wireless communication standards (e.g. NR and pre-5G standards). Modifications required under the eventual 5G standard(s) that are not incompatible with teachings of the present disclosure may be made to such teachings in appropriate circumstances.

Although the present specification describes components and functions that may be implemented in particular embodiments with reference to particular standards and protocols, the disclosure is not limited to such standards and protocols. For example, standards and protocols such as CP-OFDM represent examples of the state of the art. Such standards and protocols are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a test device for simulating analog beams applied to a DUT (DUT) includes a memory and a processor. The memory stores instructions. The processor executes the instructions. When executed by the processor, the instructions cause the test device to perform a process. The process includes obtaining, from the memory and based on instructions received for testing the DUT, a first predetermined power level for a first beam to be simulated for the DUT and a first predetermined time delay for the first beam to be simulated for the DUT. The process also includes applying the first predetermined power level for the first beam and first predetermined time delay for the first beam to a first set of subcarriers and cyclic prefix orthogonal frequency-division multiplexing (CP-OFDM) symbol to obtain simulated characteristics of the first beam from the perspective of the DUT. The process also includes sending, over a wired connection, the simulated characteristics of the first beam from the processor to the DUT.

According to another aspect of the present disclosure the test device comprises a network emulator.

According to yet another aspect of the present disclosure, the simulated characteristics of the first beam are sent over the wired connection in lieu of the first beam being transmitted wirelessly.

According to still another aspect of the present disclosure, the simulated characteristics of the first beam are sent over the wired connection directly to an antenna port of the DUT to simulate characteristics of the first beam of the DUT when received by the antenna port connected to the DUT.

According to another aspect of the present disclosure, the instructions for testing the DUT comprise a simulated type of antenna of the DUT.

According to yet another aspect of the present disclosure, the instructions for testing the DUT comprise a simulated relative orientation of the antenna of the DUT and the antenna of the network emulator.

According to still another aspect of the present disclosure, the instructions for testing the DUT comprise a plurality of beams to be simulated in a configurable pattern for testing the DUT.

According to another aspect of the present disclosure, the memory stores a correspondence between each of the plurality of beams and corresponding predetermined power levels and time delays for each of the plurality of beams.

According to yet another aspect of the present disclosure, the instructions for testing the DUT specify the first beam. The memory stores a correspondence between the first beam and the first predetermined power level and the first predetermined time delay for the first beam.

According to still another aspect of the present disclosure, when executed by the processor, the instructions further cause the test device to perform a process that includes obtaining, from the memory and based on instructions received for testing the DUT, a second predetermined power level for a second beam to be simulated for the DUT and a second predetermined time delay for the second beam to be simulated for the DUT. The process also includes applying the second predetermined power level for the second beam and second predetermined time delay for the second beam to a second set of subcarriers and cyclic prefix orthogonal frequency-division multiplexing (CP-OFDM) symbol to obtain simulated characteristics of the second beam from the perspective of the DUT. The process moreover includes sending, over the wired connection, the simulated characteristics of the second beam from the test device to the DUT.

According to another aspect of the present disclosure, the test device also includes a cyclic prefix orthogonal frequency-division multiplexing transmitter. The first beam and the second beam are simulated to be originated from the cyclic prefix orthogonal frequency-division multiplexing transmitter.

According to yet another aspect of the present disclosure, each of the first beam and the second beam corresponds to a different cyclic prefix orthogonal frequency-division multiplexing subcarrier.

According to still another aspect of the present disclosure, each of the first beam and the second beam corresponds to a different cyclic prefix orthogonal frequency-divisional multiplexing symbol.

According to another aspect of the present disclosure, the DUT comprises a base station that communicates via analog beamforming.

According to yet another aspect of the present disclosure, when executed by the processor, the instructions also cause the test device to perform a process that includes applying the time delay as a phase rotation that changes based on the subcarrier position in a beam model of the simulated beam, and performing Inverse Fast Fourier Transform (IFFT) on the beam model to obtain a transformed beam model in which the phase rotation is converted to a cyclic time shift in a time domain.

According to an aspect of the present disclosure, a network emulator includes a memory, a processor and a transmitter. The memory stores instructions. The processor executes the instructions. The transmitter transmits simulated characteristics of a first beam from the network emulator to a DUT. When executed by the processor, the instructions cause the network emulator to perform a process. The process includes obtaining, from the memory and based on instructions received for testing the DUT, a first predetermined power level for the first beam to be simulated for the DUT and a first predetermined time delay for the first beam to be simulated for the DUT. The process also includes applying the predetermined power level for the first beam and predetermined time delay for the first beam to a first set of subcarriers and cyclic prefix orthogonal frequency-division multiplexing (CP-OFDM) symbols to obtain simulated characteristics of the first beam from the perspective of the DUT. The process moreover includes sending, over a wired connection, the simulated characteristics of the first beam from the test device to the DUT.

According to an aspect of the present disclosure, a method for simulating analog beams applied to a DUT includes transmitting simulated characteristics of a first beam from a test device to the DUT. A first predetermined power level for the first beam to be simulated for the DUT and a first predetermined time delay for the first beam to be simulated for the DUT are obtained from a memory of the test device based on instructions received for testing the DUT. The predetermined power level for the first beam and predetermined time delay for the first beam are applied to a first set of subcarriers and cyclic prefix orthogonal frequency-division multiplexing (CP-OFDM) symbol(s) to obtain simulated characteristics of the first beam from the perspective of the DUT. The simulated characteristics of the first beam are sent over a wired connection from the test device to the DUT.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A test device for simulating analog beams applied to a device under test (DUT), the test device comprising:
   a memory that stores instructions; and
   a processor that executes the instructions,
   wherein, when executed by the processor, the instructions cause the test device to perform a process comprising:
      obtaining, from the memory and based on received instructions for testing the DUT, a first predetermined power level for a first beam to be simulated for the DUT and a first predetermined time delay for the first beam to be simulated for the DUT;
      applying the first predetermined power level for the first beam and the first predetermined time delay for the first beam to a first set of subcarriers and cyclic prefix orthogonal frequency-division multiplexing (CP-OFDM) symbol to obtain simulated characteristics of the first beam from a perspective of the DUT; and
      sending, over a wired connection, the simulated characteristics of the first beam from the processor to the DUT for testing the DUT using the simulated characteristics of the first beam to simulate wireless communication without over-the-air (OTA) transmission.

2. The test device of claim 1,
   wherein the test device comprises a network emulator.

3. The test device of claim 1,
   wherein the simulated characteristics of the first beam are sent over the wired connection directly to an antenna port of the DUT to test the DUT using the simulated characteristics of the first beam when received by the antenna port connected to the DUT.

4. The test device of claim 1,
   wherein the instructions for testing the DUT comprise a simulated type of antenna of the DUT.

5. The test device of claim 1,
wherein the instructions for testing the DUT comprise a simulated relative orientation of an antenna of the DUT and an antenna of the test device.

6. The test device of claim 1,
wherein the instructions for testing the DUT comprise a plurality of beams to be simulated in a configurable pattern for testing the DUT.

7. The test device of claim 6,
wherein the memory stores a correspondence between each of the plurality of beams and corresponding predetermined power levels and time delays for each of the plurality of beams.

8. The test device of claim 1,
wherein the instructions for testing the DUT specify the first beam, and
wherein the memory stores a correspondence between the first beam and the first predetermined power level and the first predetermined time delay for the first beam.

9. The test device of claim 1,
wherein, when executed by the processor, the instructions further cause the test device to perform a process comprising:
obtaining, from the memory and based on received instructions for testing the DUT, a second predetermined power level for a second beam to be simulated for the DUT and a second predetermined time delay for the second beam to be simulated for the DUT, and
applying the second predetermined power level for the second beam and the second predetermined time delay for the second beam to a second set of subcarriers and cyclic prefix orthogonal frequency-division multiplexing (CP-OFDM) symbol to obtain simulated characteristics of the second beam from the perspective of the DUT, and
sending, over the wired connection, the simulated characteristics of the second beam from the test device to the DUT for further testing the DUT using the simulated characteristics of the second beam to simulate wireless communication without OTA transmission.

10. The test device of claim 9, further comprising:
a cyclic prefix orthogonal frequency-division multiplexing transmitter,
wherein the first beam and the second beam are simulated to be originated from the cyclic prefix orthogonal frequency-division multiplexing transmitter.

11. The test device of claim 10,
wherein each of the first beam and the second beam corresponds to a different cyclic prefix orthogonal frequency-division multiplexing subcarrier.

12. The test device of claim 10,
wherein each of the first beam and the second beam corresponds to a different cyclic prefix orthogonal frequency-divisional multiplexing symbol.

13. The test device of claim 1,
wherein the DUT comprises a base station that communicates via analog beamforming.

14. The test device of claim 1,
wherein, when executed by the processor, the instructions further cause the test device to perform a process comprising:
applying the first predetermined time delay as a phase rotation that changes based on subcarrier position in a beam model of the first beam; and
performing Inverse Fast Fourier Transform (IFFT) on the beam model to obtain a transformed beam model in which the phase rotation is converted to a cyclic time shift in a time domain.

15. A network emulator for simulating analog beams applied to a device under test (DUT), the network emulator comprising:
a memory that stores instructions;
a processor that executes the instructions; and
a transmitter that sends simulated characteristics of a beam to the DUT over a wired connection,
wherein, when executed by the processor, the instructions cause the network emulator to perform a process comprising:
obtaining, from the memory and based on instructions received for testing the DUT, a predetermined power level for the beam to be simulated for the DUT and a predetermined time delay for the beam to be simulated for the DUT;
applying the predetermined power level for the beam and the predetermined time delay for the beam to a set of subcarriers and cyclic prefix orthogonal frequency-division multiplexing (CP-OFDM) symbol to obtain simulated characteristics of the beam from a perspective of the DUT, and
sending, via the transmitter over the wired connection, the simulated characteristics of the beam from the network emulator to the DUT for testing the DUT using the simulated characteristics of the beam to simulate wireless communication without over-the-air (OTA) transmission.

16. A method for simulating analog beams applied to a device under test (DUT), comprising:
obtaining, from a memory of a test device and based on instructions received for testing the DUT, a first predetermined power level and a first predetermined time delay for a first beam to be simulated for the DUT;
applying the first predetermined power level and the first predetermined time delay for the first beam to a first set of subcarriers and cyclic prefix orthogonal frequency-division multiplexing (CP-OFDM) symbol to obtain simulated characteristics of the first beam from a perspective of the DUT; and
testing the DUT in response to the simulated characteristics of the first beam by sending, over a wired connection, the simulated characteristics of the first beam from the test device to an antenna port of the DUT, simulating wireless communication without over-the-air (OTA) transmission.

17. The method of claim 16, further comprising:
obtaining, from the memory and based on the instructions received for testing the DUT, a second predetermined power level and a second predetermined time delay for a second beam to be simulated for the DUT;
applying the second predetermined power level and the second predetermined time delay for the second beam to a second set of subcarriers and cyclic prefix orthogonal frequency-division multiplexing (CP-OFDM) symbol to obtain simulated characteristics of the second beam from the perspective of the DUT; and
further testing the DUT in response to the simulated characteristics of the second beam by sending, over the wired connection, the simulated characteristics of the second beam from the test device to the antenna port of the DUT.

* * * * *